United States Patent
Chan et al.

(10) Patent No.: US 6,171,879 B1
(45) Date of Patent: Jan. 9, 2001

(54) METHODS OF FORMING THERMO-MECHANICAL SENSOR

(75) Inventors: Tsiu Chiu Chan, Dallas; Melvin Joseph DeSilva, Collin, both of TX (US)

(73) Assignee: STMicroelectronics, Inc., Carrollton, TX (US)

(*) Notice: Under 35 U.S.C. 154(b), the term of this patent shall be extended for 0 days.

(21) Appl. No.: 09/222,171

(22) Filed: Dec. 29, 1998

Related U.S. Application Data

(62) Division of application No. 08/957,802, filed on Oct. 24, 1997, now Pat. No. 5,917,226.

(51) Int. Cl.[7] ................................................ H01L 21/00
(52) U.S. Cl. ............................. 438/52; 438/51; 438/739; 251/415
(58) Field of Search .................................. 438/48, 50, 51, 438/52, 53, 54, 55

(56) References Cited

U.S. PATENT DOCUMENTS

| | | | |
|---|---|---|---|
| 3,727,209 | 4/1973 | White et al. ............................ | 340/262 |
| 3,766,616 | 10/1973 | Staudte .................................. | 29/25.35 |
| 3,969,640 | 7/1976 | Staudte .................................. | 310/9.1 |
| 4,272,840 | 6/1981 | Morozumi et al. ..................... | 368/202 |
| 4,320,320 | 3/1982 | Momosaki et al. ..................... | 310/361 |
| 4,443,116 | 4/1984 | Yoshida et al. ........................ | 368/202 |
| 4,464,061 | 8/1984 | Kamiya ................................. | 368/202 |
| 4,783,237 | * 11/1988 | Aine et al. .............................. | 437/15 |
| 5,006,487 | * 4/1991 | Stokes .................................... | 437/228 |
| 5,198,716 | 3/1993 | Godshall et al. ...................... | 310/349 |
| 5,233,456 | 8/1993 | Nelson .................................. | 359/214 |
| 5,417,312 | 5/1995 | Tsuchitani et al. .................... | 188/181 |
| 5,444,641 | 8/1995 | White .................................... | 364/484 |
| 5,463,233 | 10/1995 | Norling ................................. | 257/254 |
| 5,504,356 | 4/1996 | Takeuchi ............................... | 257/254 |
| 5,506,454 | 4/1996 | Hanzawa et al. ...................... | 307/10.1 |
| 5,559,358 | 9/1996 | Burns et al. ........................... | 257/431 |
| 5,576,251 | 11/1996 | Garabedian et al. .................. | 437/228 |
| 5,578,843 | 11/1996 | Garabedian et al. .................. | 257/254 |
| 5,587,343 | * 12/1996 | Kano et al. ............................ | 437/228 |
| 5,610,335 | 3/1997 | Shaw et al. ........................... | 73/514.36 |
| 5,610,337 | 3/1997 | Nelson .................................. | 73/651 |
| 5,640,133 | 6/1997 | MacDonald et al. .................. | 333/197 |
| 5,659,195 | 8/1997 | Kaiser et al. .......................... | 257/415 |
| 5,772,322 | 6/1998 | Burns et al. ........................... | 374/118 |
| 5,772,902 | 6/1998 | Reed et al. ............................ | 216/2 |

* cited by examiner

*Primary Examiner*—John F. Niebling
*Assistant Examiner*—Viktor Simkovic
(74) *Attorney, Agent, or Firm*—Theodore E. Galanthay; Lisa K. Jorgenson; Christopher F. Regan

(57) ABSTRACT

An integrated circuit and method are provided for sensing activity such as temperature variations in a surrounding environment. The integrated released beam sensor preferably includes a switch detecting circuit region and a sensor switching region connected to the switch detecting circuit region. The sensor switching region preferably includes a fixed contact layer, a sacrificial layer on the fixed contact layer, and a floating contact on the sacrificial layer and having portions thereof overlying the fixed contact layer in spaced relation therefrom in an open switch position and extending lengthwise generally transverse to a predetermined direction. The floating contact preferably includes at least two layers of material. Each of the at least two layers have a different thermal expansion coefficient so that the floating contact displaces in the predetermined direction responsive to a predetermined temperature variation so as to contact the fixed contact layer and thereby form a closed switch position. The methods of forming an integrated sensor advantageously are preferably compatible with known integrated circuit manufacturing processes, such as for CMOS circuit manufacturing, with only slight variations therefrom.

16 Claims, 4 Drawing Sheets

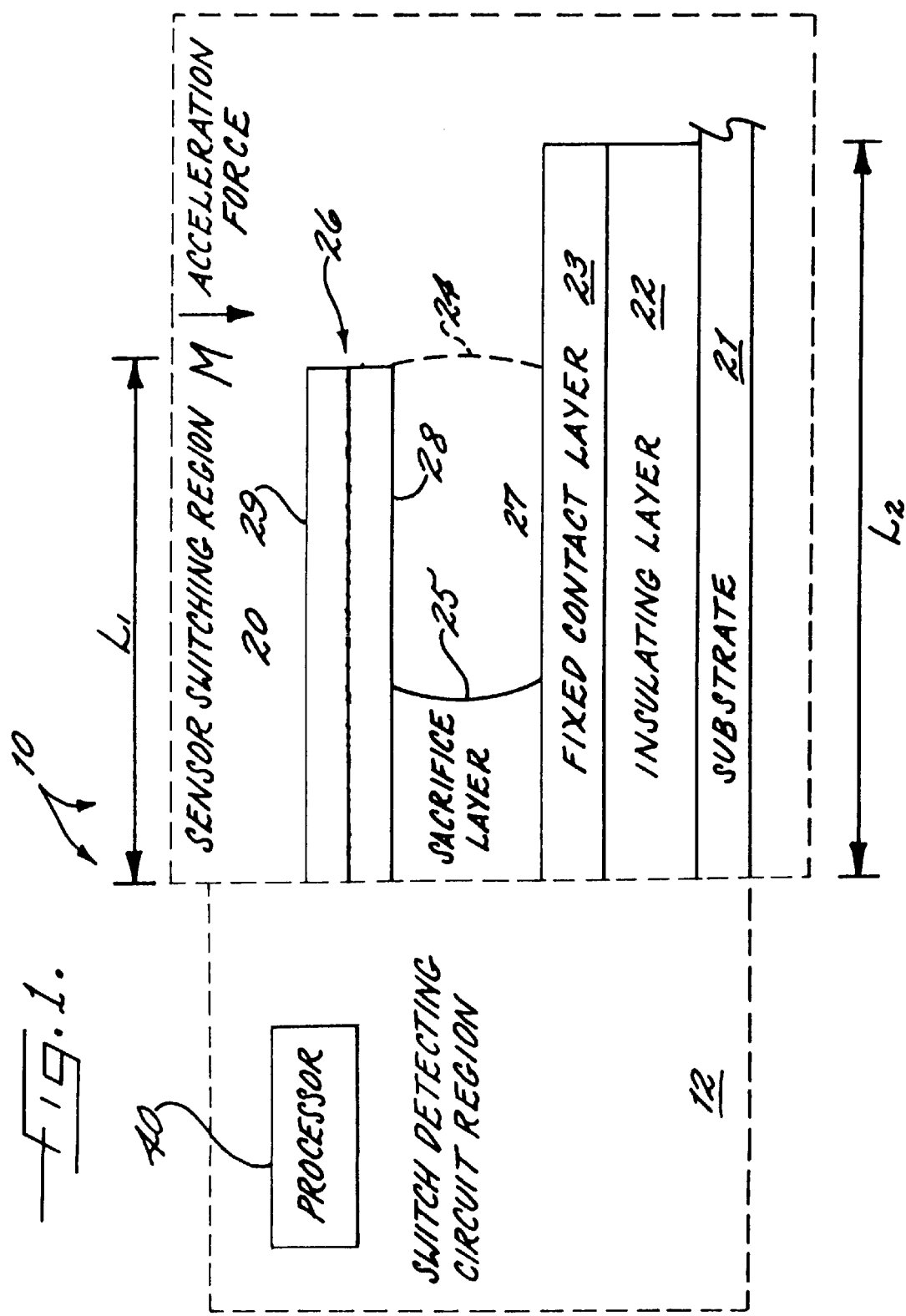

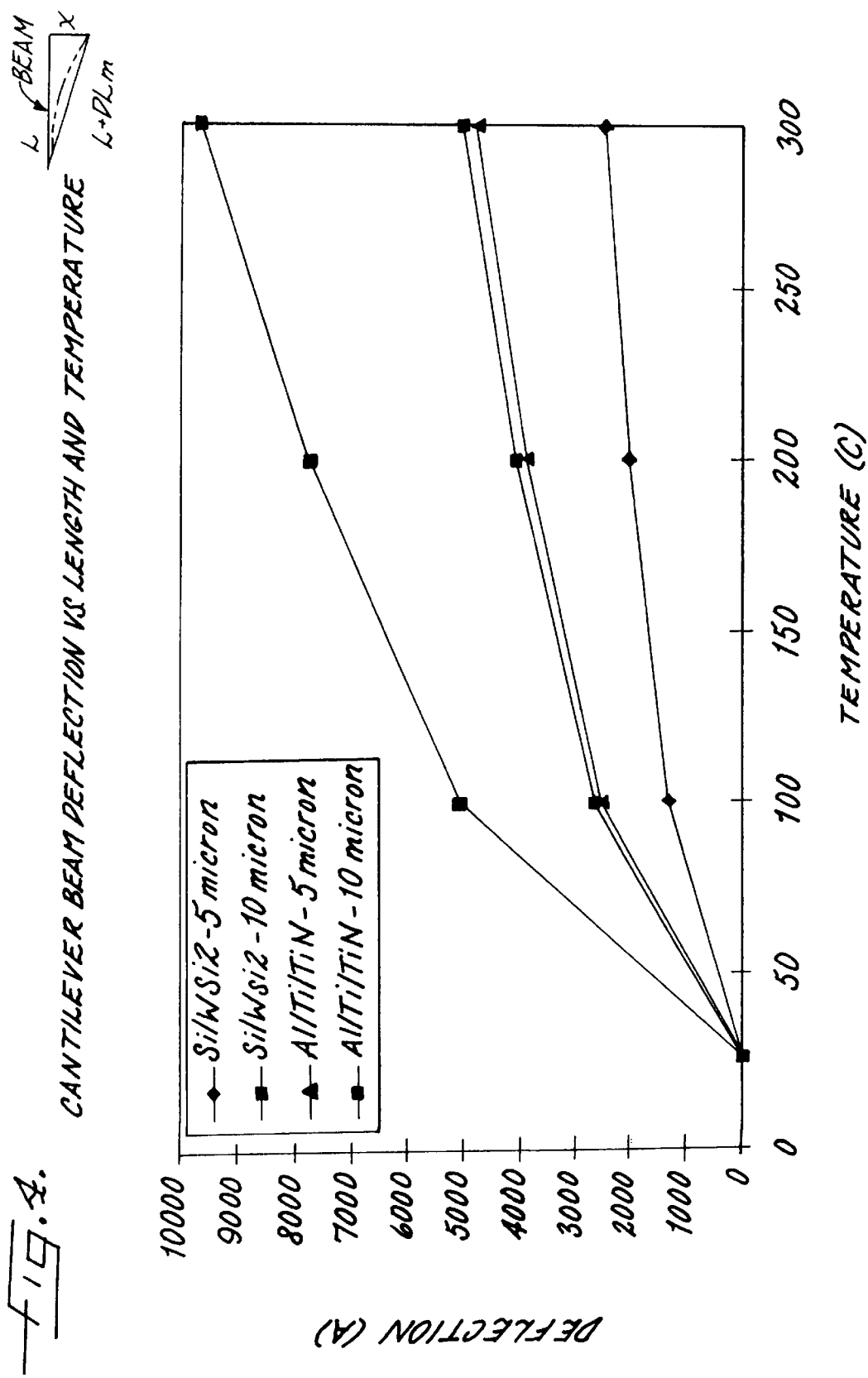
Fig. 4. Cantilever beam deflection vs length and temperature

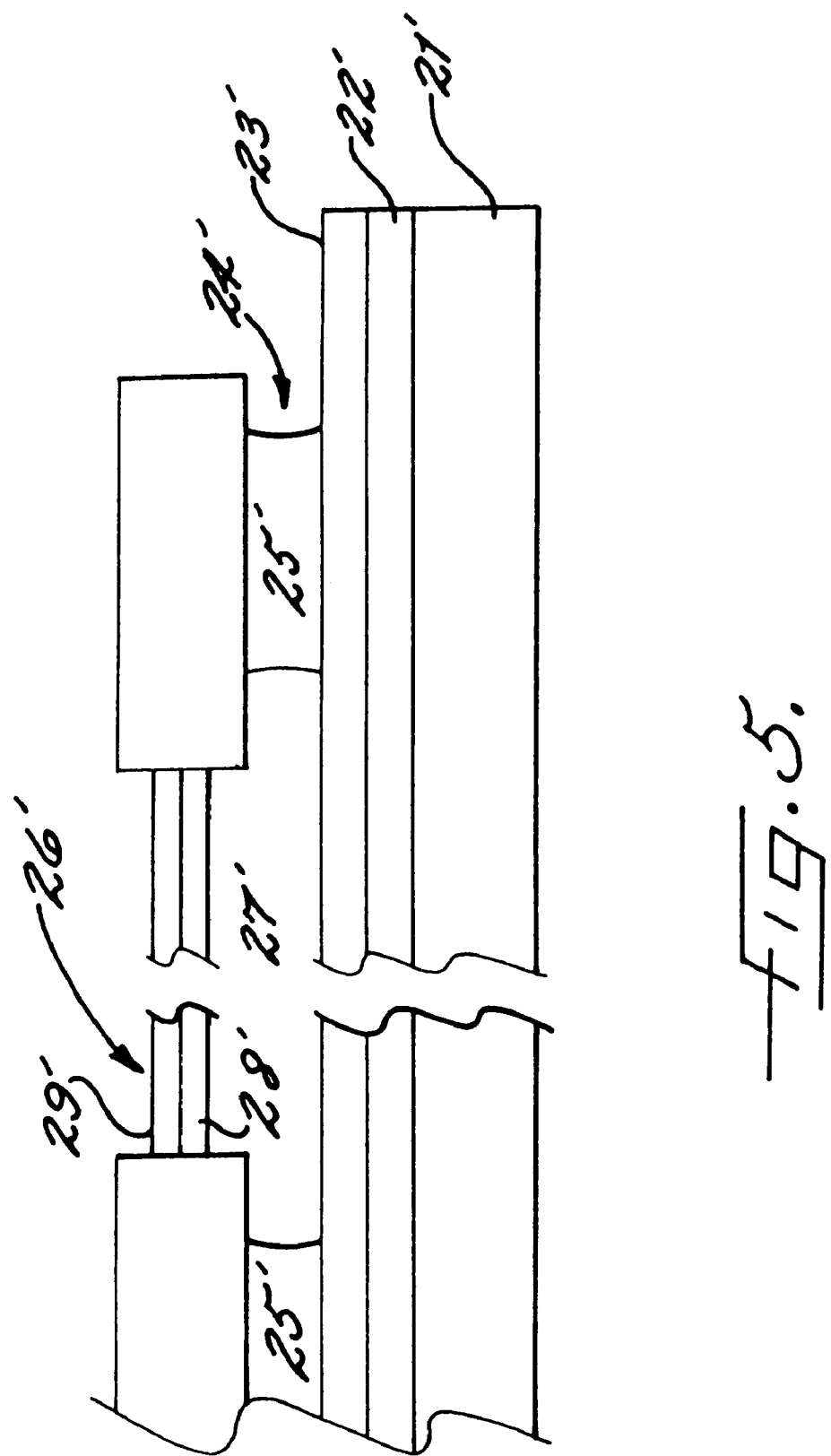

METHODS OF FORMING THERMO-MECHANICAL SENSOR

This application is a divisional of Ser. No. 08/957,802, filed on Oct. 24, 1997, now U.S. Pat. No. 5,917,226.

FIELD OF THE INVENTION

The present invention relates to the field of integrated circuits, and, more particularly, to an integrated circuit and method having the capability of sensing activity.

BACKGROUND OF THE INVENTION

Over the years, various microelectromechanical systems ("MEMS") have arisen which require the necessity to sense temperature, pressure, strain, acceleration, rotation, infrared radiation, chemical properties of liquids and gases, and other physical inputs. Accordingly, various types of microsensors have been developed which receive analog and digital electrical inputs and also sense or measure these other physical inputs, e.g., acceleration, pressure, temperature, strain.

Integrated circuits are widely used in many of these MEMS or electronic applications. Various integrated circuit manufacturing processes, e.g., very large scale integrated ("VLSI"), are also widely known and provide various advantages. The complimentary metal oxide semiconductor ("CMOS") manufacturing technology, for example, generally provides a low power dissipation advantage over known metal oxide semiconductor ("MOS") processes. Microsensor manufacturing which is compatible with known integrated circuit manufacturing processes, however, can be quite complicated, especially because of a need for integrating various types of structures at relatively low cost.

Some types of well known thermosensors, for example, are thermistors and thermocouples for measuring the temperature of a surrounding environment. Thermistors and resistive temperature detectors ("RTDs") are primarily based on the concept of change of mobility and carrier density with temperature. These changes are often represented by temperature coefficients that may be constants or nonlinear functions of temperature. Because resistance of a thermistor is generally an exponential function, linearization networks are often used to make the output of a thermistor a linear function over a desired range. These linearization networks, however, often require the sacrifice of sensitivity.

A thermocouple, on the other hand, is generally based on a thermoelectric effect known as the Seebeck effect. Two different metals are usually joined at one point to form a thermocouple. Various metals, for example, can be used for various temperature ranges and sensitivity. Semiconductors can also be used with a metal to form a microthermocouple. The two materials are conventionally joined together at one end, e.g., a sensing junction, and terminated at their other ends in such a manner that the terminals, e.g., a reference junction, are both at the same and known temperature, e.g., a reference temperature. The leads from the reference junction are connected to a load resistance to complete the thermocouple circuit. Due to the Seebeck effect, a current is caused to flow through the circuit whenever the sensing junction and the reference junction are at different temperatures. Often in practice, for example, the reference junction is either held at a known constant temperature or is electrically compensated for variations in a preselected temperature.

Both the thermistor and the thermocouple, however, produce analog outputs which often are not readily compatible with associated detection circuitry or logic circuitry. Also, processing or detecting circuitry can increase overhead and costs associated with producing a microsensor, and especially an integrated sensor.

SUMMARY OF THE INVENTION

With the foregoing in mind, the present invention advantageously provides an integrated CMOS sensor and associated methods for sensing temperature variations in a surrounding environment. The present invention also advantageously provides an integrated sensor that is readily compatible with existing integrated circuit manufacturing technology and manufacturing processes, that has greater tolerance for small critical dimensions, and that provides better signal indication when interfacing with logic of an integrated circuit. The present invention additionally provides a cost effective method of forming an integrated sensor for sensing activity desired to be sensed, such as temperature variation in a surrounding environment or ambient environment.

More particularly, the integrated sensor preferably includes a switch detecting circuit.region and a sensor switching region connected to and positioned adjacent the switch detecting circuit region. The switch detecting circuit region is preferably provided by a CMOS switch detecting circuit region, such as an inverter circuit. The sensor switching region preferably includes a fixed contact layer, a sacrificial layer on the fixed contact layer, and a floating contact on the remaining portions of the sacrificial layer and overlying the fixed contact layer in spaced relation therefrom when in an open switch position. The floating contact also preferably extends lengthwise generally transverse to a predetermined direction. The floating contact is preferably formed of at least two layers of material, e.g., upper and lower layers, that have different thermal expansion coefficients so that the floating contact displaces in the predetermined direction responsive to a predetermined temperature variation and the difference in coefficients. The floating contact preferably then contacts the fixed contact layer responsive to sensing of the predetermined temperature variation so as to form a closed switch position. The switch detecting circuit region, for example, advantageously can then generate a signal responsive to the contact of the floating contact with the fixed contact layer, the separation of the floating contact from the fixed contact layer, or both the contact and the separation of the floating contact with the fixed contact layer.

According to a first embodiment of the present invention, the floating contact defines a released cantilever beam. This release cantilever configuration, for example, preferably has a sacrificial layer positioned between a first conducting layer defining the fixed contact layer and a second conducting layer defining the floating contact. At least unwanted portions of the sacrificial layer are removed so that the floating contact has only one support at an end thereof defined by the remaining portions of the sacrificial layer and thereby defining a released cantilever beam configuration directly overlying the fixed contact layer.

According to a second embodiment of the present invention, the floating contact is a released beam overlying the fixed contact layer and having a configuration which includes a plurality of supports. The plurality of supports, for example, can be a double support configuration which is also formed by having a sacrificial layer positioned between a first conducting layer defining the fixed contact layer and a second conducting layer defining the floating contact. At least unwanted portions of the sacrificial layer are removed, e.g., forming a window, so that the floating contact has at least two supports, e.g., on opposing ends and defined by the remaining portions of sacrificial layer, for the floating contact and thereby defines a double support released beam configuration.

According to other aspects of the present invention, the released beam of the sensor switching region of the integrated sensor preferably extends outwardly from the switch detecting circuit region a first predetermined length. The fixed contact layer extends outwardly from the switch detecting circuit region a second predetermined length. The second predetermined length is preferably greater than the first predetermined length so that the released beam readily contacts the fixed contact layer responsive to a temperature variation.

An integrated sensor according to the present invention preferably further includes temperature calibrating means associated with the released beam for providing a calibrated predetermined temperature sensed by the integrated sensor. The temperature calibrating means preferably includes a predetermined length of the released beam so as to substantially correspond to a selected temperature calibration threshold. The selected temperature calibration threshold is established by contact of the released beam with a portion of the fixed contact layer substantially corresponding to a region of contact of the released beam with the fixed contact layer. Alternatively, or in combination, the temperature calibrating means can also include predetermined amounts of material provided in each of the at least two layers of the released beam so that the released beam displaces to a position in contact with the fixed contact layer responsive to a calibrated predetermined temperature variation.

According to yet other aspects of the present invention, an integrated sensor can also include the sensor switching region having a plurality of floating layers positioned adjacent and lengthwise extending outwardly from the switch detecting circuit region for defining a plurality of released beams so that displacement of each of the plurality of released beams in a predetermined direction occurs responsive to sensing a temperature variation. The plurality of released beams preferably include at least two released beams lengthwise extending outwardly from the switch detecting circuit region to different predetermined lengths. The plurality of beams can also include at least two released beams lengthwise extending outwardly from the switch detecting circuit region to substantially the same predetermined lengths.

The present invention also advantageously provides methods of forming an integrated sensor. A method of forming an integrated sensor preferably includes providing a switch detecting circuit region and forming a sensor switching region connected to and positioned adjacent the switch detecting circuit region. The sensor switching region is preferably formed by at least forming a first conducting layer of material on a support so as to define a fixed contact layer and forming a floating contact overlying the first conducting layer so as to define a released beam.

According to one aspect of the method, the released beam preferably forms a released cantilever beam. This method, for example, can include depositing a sacrificial layer on the first conducting layer, depositing a second conducting layer on the sacrificial layer, depositing a third conducting layer on the second conducting layer, and removing at least portions of the sacrificial layer, e.g., by isotropic etching, to release the second and third conducting layers so that the second and third conducting layers in combination define the released cantilever beam.

According to another aspect of the method, the released beam preferably forms a released beam overlying the fixed contact layer so as to have a configuration including at least two supports. This method, for example, can include depositing a sacrificial layer on the first conducting layer, depositing a second conducting layer on the sacrificial layer, depositing a third conductive layer on the second conductive layer, and removing at least portions of the sacrificial layer, e.g., by isotropic etching, to thereby define a window underlying the second conducting layer to release the second and third conducting layers so that the second and third conducting layers in combination define the released beam having the at least two supports.

According to other aspects of the method of forming an integrated sensor, the method can further include forming an insulating layer on the support prior to the step of forming the first conducting layer. The fixed contact layer is preferably formed of at least one of polysilicon and a metal, and the second and third conducting layers each are preferably formed of at least one of polysilicon, silicon, and a metal.

Therefore, the present invention advantageously provides an integrated sensor and associated methods for sensing a temperature variation which has a small chip area so that arrays of sensors readily can be fabricated on the same die. The present invention also advantageously provides integrated sensors and methods which increase the reliability of the sensing of a activity such as temperature variation. The fixed contact layer and the floating contact of the integrated sensor thereby advantageously provide a micro-mechanical sensing region that can readily be formed with known integrated circuit manufacturing processes.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 1 is a schematic block diagram of an integrated sensor having a released cantilever beam for sensing temperature variations in a surrounding environment according to a first embodiment of the present invention;

FIG. 4 is a graph of released cantilever beam deflection as a function of beam length and temperature for an integrated sensor according to a first embodiment of the present invention; and FIG. 5 is a schematic block diagram of an integrated sensor having a double-support released beam for sensing acceleration and deceleration according to a second embodiment of the present invention.

DETAILED DESCRIPTION OF PREFERRED EMBODIMENTS

The present invention will now be described more fully hereinafter with reference to the accompanying drawings which illustrate preferred embodiments of the invention. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime or double prime notation, if used, indicates similar elements in alternative embodiments.

Figure 3:
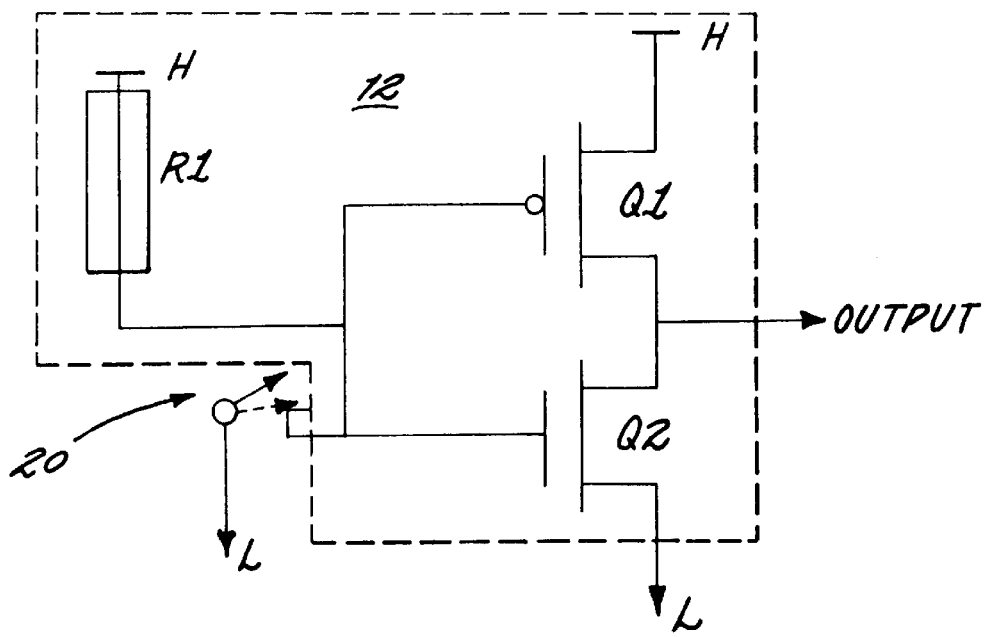
FIG. 3 is a schematic circuit diagram of an integrated sensor having a released cantilever beam for sensing temperature variations in a surrounding environment according to a first embodiment of the present invention.
Figure 2:
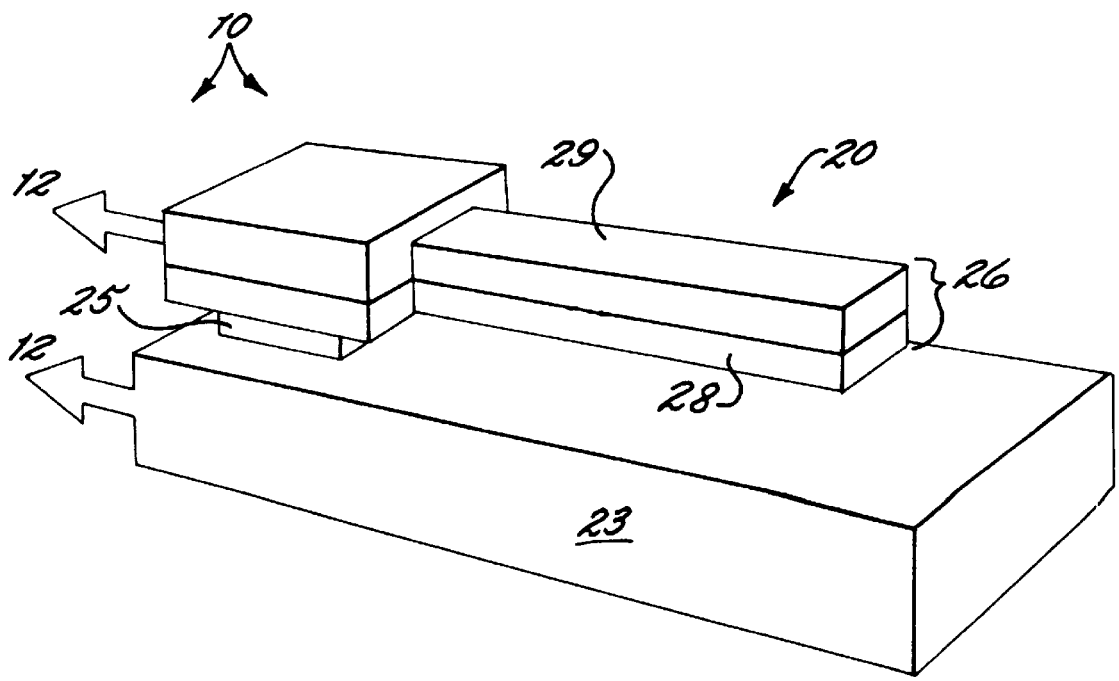
FIG. 2 is an isometric view of a sensor switching region of an integrated sensor having a released cantilever beam for sensing temperature variations in a surrounding environment according to a first embodiment of the present invention.

FIGS. 1–3 illustrate an integrated sensor 10, e.g., a microelectromechanical integrated circuit, for sensing temperature variation in a surrounding environment according to a first embodiment of the present invention. The integrated sensor 10 preferably includes a switch detecting circuit region 12 and a sensor switching region 20 connected to and positioned adjacent the switch detecting circuit region 12. The switch detecting circuit region 12 is preferably provided by a CMOS switch detecting circuit region, such as an inverter circuit (see, e.g., FIG. 3). The CMOS switch circuit region 12 may also include a processor 40 connected to the inverter circuit for processing signals responsive to the inverter. The processor 40, for example, can be a processing circuit, a logic circuit, or a microprocessor or microcontroller as understood by those skilled in the art.

The sensor switching region 20 preferably includes a fixed contact layer 23, remaining portions of a sacrificial layer 24 on the fixed contact layer 23, and a floating contact 26 on at least portions of the sacrificial layer 24 and having portions thereof directly overlying the fixed contact layer 23 in a spaced relation in an open switch position. The spaced relation preferably is formed by removal of unwanted portions of the sacrificial layer, e.g., preferably by an isotropic etching process.

The floating contact 26 is preferably formed of at least two layers of material, e.g., upper and lower layers 28, 29, that have different thermal expansion coefficients. For example, the lower layer can be polysilicon and the upper layer can be a refractory metal, e.g., tungsten silicide ($WSi_2$). The floating contact 26, for example, can also be polysilicon and tantalum silicide ($TaSi_2$) or aluminum, titanium nitride, and titanium (Al/TiN/Ti) as three layers. Preferably, each of the two layers includes at least one of the following materials: polysilicon, silicon, tungsten, tungsten silicide, titanium, titanium nitride, tantalum silicide, and tantalum nitride. The floating contact 26 also preferably extends lengthwise generally transverse to a predetermined direction so that flexible displacement of the floating contact 26 responsively corresponds to a larger thermal expansion of the upper layer due to a temperature variation being sensed in the surrounding environment or the ambient environment. The floating contact 26 preferably then contacts the fixed contact layer 23 during sensing of a temperature variation so as to form a closed switch position. This contact between the floating contact 26 and the fixed contact 23 occurs by the downward flexing movement of the released beam toward the underlying fixed contact layer 23. If the floating contact 26 is in a normally open position, for example, the switch detecting circuit region 12 then preferably generates a signal responsive to contact of the floating contact 26 with the fixed contact layer 23 indicating that contact or closed switch position has occurred. Accordingly, it will be understood by those skilled in the art that alternatively the switch detecting circuit region 12, for example, advantageously can generate a signal responsive to the separation of the floating contact from the fixed contact layer or both the contact and the separation of the floating contact with the fixed contact layer.

According to a first embodiment of the present invention, the floating contact 26 defines a released cantilever beam (see FIG. 2). This release cantilever configuration, for example, forms by having a sacrificial layer 24 positioned between a first conducting layer defining the fixed contact layer 23 and the combination of the second and third conducting layers which define the floating contact 23. At least unwanted portions 27 of the sacrificial layer 24 are removed so that the floating contact 26 advantageously has only one support preferably at an end thereof defined by the remaining portions 25 of the sacrificial layer and thereby defining a released cantilever beam configuration (see FIG. 1). The released cantilever beam preferably has a generally uniform thickness extending substantially the entire length thereof.

As perhaps best illustrated in FIG. 5, according to a second embodiment of an integrated sensor 10' of the present invention, the floating contact 26' of the sensor switching region 20' is a released beam overlying the fixed contact layer 23' and has a configuration which includes a plurality of supports 25'. The plurality of supports 25', for example, can be a double or dual support configuration which also forms by having a sacrificial layer 24' positioned between a first conducting layer defining the fixed contact layer 23' and a second conducting layer defining the floating contact 26'. At least unwanted portions 27' of the sacrificial layer 24' are removed, e.g., forming a window, so that the floating contact 26' has at least two supports 25', e.g., preferably on opposing ends, for the floating contact 26' defined by the remaining portions 25' of sacrificial layer 24'. A window is formed in between the opposing supported ends, and the remaining portion in combination thereby define a double support released beam configuration.

This double or dual support released beam configuration will generally have different calibration characteristics for length and thickness. The flexing or moving region of the beam, for example, will generally require about twice the amount of material in the layer with the larger thermal coefficient for a corresponding thickness and length of the released cantilever beam configuration. Nevertheless, the double support configuration, for example, advantageously can reduce potential "stick on" events and reduce overstress or overstrain conditions on portions of the beam.

According to other aspects of the present invention, the released beam 26 of the sensor switching region 20 of the integrated sensor 10 preferably extends outwardly from the switch detecting circuit region 12 a first predetermined length L1 (see FIG. 1). The fixed contact layer 23 extends outwardly from the switch detecting circuit region 12 a second predetermined length L2. The second predetermined length L2 is preferably greater than the first predetermined length L1 so that the released beam 26 readily contacts the fixed contact layer 23 during sensing of a temperature variation so as to form the closed switch position. This greater length L2, for example, advantageously can allow a better contact from the released beam 26 so that a signal generated by the contact with the fixed contact layer 23 more accurately indicates the closed switch position.

FIG. 3 illustrates a schematic circuit diagram for the integrated sensor 10 according to the first and second embodiments of the present invention. The sensor switching region 20 of the integrated sensor 10 preferably operates to provide a digital output such as provided by a cantilever switch. The CMOS switch detecting region 12, for example, can be an inverter which includes a PMOS field effect transistor Q1 and an NMOS field effect transistor Q2. The circuit region 12 can also include a resistor R1, e.g., preferably provided by a poly resistor ($10^{12}$ Ohms or Teraohms), connected to the gates of the transistors Q1, Q2 of the inverter as illustrated.

Operationally, when the input across the resistor R1 is high and the switch 20 is open, e.g., no contact occurs from the released beam 26 to the fixed contact layer 23, then the output from the inverter is low. When the temperature of the beam changes, the switch 20 closes and the low input is received by the inverter so that the output from the inverter is high. In an alternative embodiment, the switch can also open as the temperature of the beam changes. In other words, and by way of example, as the temperature decreases or becomes colder, the beam moves in a generally downward direction to a closed switch position. As the temperature increases or becomes hotter, the beam moves in a generally upward direction to an open switch position. Accordingly, the switch can advantageously operate on either the open to closed or closed to open conditions.

The integrated sensor 10 also preferably has a relationship between the displacement or deflection of released cantilever beams as a function of temperature and beam length. FIG. 4, for example, graphically illustrates the deflection of polysilicon cantilever beams as a function of temperature and beam lengths at 5 and 10 microns for Si/WSi$_2$ and Al/TiN/Ti. The following Table 1 illustrates an example of a calculation for this function which was used in the graph illustrated in FIG. 4:

Also, the deflection or displacement distance can be approximately calculated as follows:

$$X = L * \{(A1+A2)*(T2-T1)\}^{1/2}$$

The calculations in Table 1 are based upon bulk physical constants, and the deflection values are approximate values based upon first order approximations. For example, the released cantilever beam 26 having a length L curves downward with increasing temperature, but the arc of this curve or flexing movement has been approximated with a straight line X for illustrative purposes, and the hypotenuse of the right triangle formed by legs L and X is approximately L+DLm.

An integrated sensor 10 according to the present invention preferably further includes temperature calibrating means associated with the released beam 26 for providing a calibrated temperature sensed by the integrated sensor 10. The temperature calibrating means preferably includes a predetermined length L1 of the released beam 26 so as to substantially correspond to a selected temperature calibration threshold (see also FIG. 4). The selected temperature calibration threshold is preferably established, confirmed, or defined by a portion of the fixed contact layer 23 substantially corresponding to a region of contact of the released beam 26 with the fixed contact layer 23. In other words, the length for a preselected thickness of the released beam 26 is preferably pre-calculated so that contact with the fixed Thermo-Mechanical Transducers

| metal 1 | metal 2 | T1 (Thick) | T2 (Thick) | A1 (Exp coeff) | A2 (Exp coeff) | RoomT (T1) | Temp (T2) | Length | L1 | L2 | DLm | X |
|---|---|---|---|---|---|---|---|---|---|---|---|---|
| Si | WSi2 | 2000 | 2000 | 2.33E-06 | 7.00E-06 | 25 | 100 | 50000 | 50008.74 | 50062.25 | 17 | 1323 |
| Si | WSi2 | 2000 | 2000 | 2.33E-06 | 7.00E-06 | 25 | 200 | 50000 | 50020.39 | 50061.25 | 41 | 2020 |
| Si | WSi2 | 2000 | 2000 | 2.33E-06 | 7.00E-06 | 25 | 300 | 50000 | 50032.04 | 50096.25 | 64 | 2533 |
| Si | WSi2 | 2000 | 2000 | 2.33E-06 | 7.00E-06 | 25 | 100 | 100000 | 100017.5 | 100052.5 | 35 | 2645 |
| Si | WSi2 | 2000 | 2000 | 2.33E-06 | 7.00E-06 | 25 | 200 | 100000 | 100040.8 | 100122.5 | 82 | 4041 |
| Si | WSi2 | 2000 | 2000 | 2.33E-06 | 7.00E-06 | 25 | 300 | 100000 | 100064.1 | 100192.5 | 128 | 5065 |
| Si | TaSi2 | 2000 | 2000 | 2.33E-06 | 1.00E-05 | 25 | 100 | 50000 | 50008.74 | 50037.5 | 23 | 1520 |
| Si | TaSi2 | 2000 | 2000 | 2.33E-06 | 1.00E-05 | 25 | 200 | 50000 | 50020.39 | 50087.5 | 54 | 2323 |
| Si | TaSi2 | 2000 | 2000 | 2.33E-06 | 1.00E-05 | 25 | 300 | 50000 | 50032.04 | 50137.5 | 85 | 2912 |
| Si | TaSi2 | 2000 | 2000 | 2.33E-06 | 1.00E-05 | 25 | 100 | 100000 | 100017.5 | 100075 | 46 | 3041 |
| Si | TaSi2 | 2000 | 2000 | 2.33E-06 | 1.00E-05 | 25 | 200 | 100000 | 100040.8 | 100175 | 108 | 4645 |
| Si | TaSi2 | 2000 | 2000 | 2.33E-06 | 1.00E-05 | 25 | 300 | 100000 | 100064.1 | 100275 | 170 | 5823 |
| Al | Ti/TiN | 4500 | 2000 | 2.50E-05 | 9.00E-06 | 25 | 100 | 50000 | 50093.75 | 50033.75 | 64 | 2525 |
| Al | Ti/TiN | 4500 | 2000 | 2.50E-05 | 9.00E-06 | 25 | 200 | 50000 | 50218.75 | 50078.75 | 149 | 3857 |
| Al | Ti/TiN | 4500 | 2000 | 2.50E-05 | 9.00E-06 | 25 | 300 | 50000 | 50343.75 | 50123.75 | 234 | 4835 |
| Al | Ti/TiN | 4500 | 2000 | 2.50E-05 | 9.00E-06 | 25 | 100 | 100000 | 100187.5 | 100067.5 | 128 | 5050 |
| Al | Ti/TiN | 4500 | 2000 | 2.50E-05 | 9.00E-06 | 25 | 200 | 100000 | 100437.5 | 100157.5 | 298 | 7714 |
| Al | Ti/TiN | 4500 | 2000 | 2.50E-05 | 9.00E-06 | 25 | 300 | 100000 | 100687.5 | 100247.5 | 468 | 9670 |

As graphically illustrated in FIG. 4 and as illustrated in Table 1, for the released beam T1 is the thickness of the first conducting layer, T2 is the thickness of the second conducting layer, A1 is the thermal expansion coefficient of the first conducting layer, A2 is the thermal expansion coefficient of the second conducting layer, L1 is the length of the first conductive layer, L2 is the length of the second conductive layer, DLm is the approximate additional length of the released beam when in the closed switch position, X is the displacement or deflection, e.g., in the vertical direction, to the fixed contact layer, T1 is the initial temperature (e.g., room temperature), and T2 is the sensed temperature which causes the corresponding amount of displacement of the released beam. Generally, the approximated additional length (DLm) of the released beam when in the closed position can be approximately calculated as follows:

$$DLm = L*(T2-T1)*\{(A1+A2)/2\}.$$

contact layer 23 by the released beam 26 only occurs when the force due to larger thermal expansion reaches a predetermined threshold or a predetermined value. This contact, e.g., a closed switch position, is then detected by the switch detecting circuit region 12, e.g., by the inverter circuit so that the output is high (see FIG. 3). The length of the released beam 26, for example, advantageously can vary so that when a plurality of these switching sensors are used, various temperature thresholds are detected.

Alternatively, or in combination, the temperature calibrating means can also include predetermined amounts, quantities, or concentrations of material, e.g., dopant(s), provided in each of the at least two layers of the released beam so that the released beam displaces to a position in contact with the fixed contact layer responsive to a calibrated predetermined temperature variation.

According to other aspects of the present invention, an integrated sensor 10 can also include a plurality of floating contacts 26 positioned adjacent and lengthwise extending outwardly from the switch detecting circuit region 12 for defining a plurality of released beams so that displacement of each of the plurality of released beams 26 in a predetermined direction corresponds to sensing activity.

The integrated sensor 10, also advantageously has a relationship between cumulative probability and the number of working released cantilever beams of an integrated sensor 10. For example, if 5 out of 7, 7 out of 10, or 10 out of 15 of the released cantilever beams 26 "work" or switch closed, then the temperature threshold can be understood to have been detected or the event occurred. In other words, the statistical probability of an event occurring can advantageously be used for forming an integrated sensor 10 having a sensor switching region 20 which includes a plurality of these released beams 26 formed as described herein.

According to aspects of this embodiment of the present invention, the plurality of released beams 26 preferably include at least two released beams 26 lengthwise extending outwardly from the switch detecting circuit region 12 to different predetermined lengths and at least two released beams 26 lengthwise extending outwardly from the switch detecting circuit region 12 to substantially the same predetermined lengths (see FIG. 6). The sensor switching region 20 can further include at least one fixed contact layer 23 underlying the plurality of released beams 26 so that at least one of the plurality of released beams 26 contacts the at least one fixed contact layer 23 the predetermined direction M when sensing a temperature variation so as to form a closed switch position. The switch detecting circuit region 12 also preferably includes a processor 40" as described herein above.

As illustrated in FIGS. 1–7, the present invention also advantageously provides methods of forming an integrated sensor 10. A method of forming an integrated sensor 10 preferably includes providing a switch detecting circuit region 12 and forming a sensor switching region 20 connected to and positioned adjacent the switch detecting circuit region 12. The sensor switching region 20 is preferably formed by at least forming a first conducting layer of material on a support so as to define a fixed contact layer 23 and forming a floating contact 26 the overlying the first conducting layer 23 so as to define a released beam 26.

According to one aspect of the method, the released beam 26 preferably forms a released cantilever beam. This method, for example, can include depositing a sacrificial layer 24 on the first conducting layer 23, depositing a second conducting layer 28 on the sacrificial layer 24, depositing a third conducting layer 29 on the second conducting layer 28, and removing at least unwanted portions 27 of the sacrificial layer 24, e.g., preferably by isotropic etching, to release the second and third conducting layers 28, 29 that the second and third conducting layers in combination define the released cantilever beam 26.

According to another aspect of the method, the released beam 26' preferably forms a released beam overlying the fixed contact layer 23' so as to have a configuration including at least two supports 25'. This method, for example, can include depositing a sacrificial layer 24' on the first conducting layer 23', depositing a second conducting layer 28' on the sacrificial layer 24', depositing a third conducting layer 29' on the second conducting layer 28', and removing at least unwanted portions 27' of the sacrificial layer 24', e.g., preferably by isotropic etching, to thereby define a window and to thereby release the combination of the second and third conducting layers 28', 29' which define the released beam 26' having the at least two supports 25'.

According to other aspects of the method of forming an integrated sensor 10, the method can further include forming an insulating layer or plate 22, e.g., preferably provided by a nitride layer or a nitride layer on a field oxide, on the support plate 21 prior to the step of forming the first conducting layer 23. The fixed contact layer 23 is preferably formed of at least one of a polysilicon material and a metal material, and the second floating conducting layer 26 is also preferably formed of polysilicon and a refractory metal material. Both the fixed contact layer and the released beam are preferably formed of polysilicon so that they can advantageously be readily formed when other CMOS switch detecting circuitry is being formed, e.g., a continuous process, wherein other polysilicon material is conventionally used. Both the fixed contact layer and the released beam are also connected to the switch detecting circuit region 12 as illustrated in FIGS. 1–3 and 5.

For example, in forming the integrated sensor 20 according to a method of the invention, a wafer or substrate 21 can be prepared and an initial field oxide layer formed thereon for a target thickness. A nitride layer 22 can then be deposited on the oxide layer. Most of the CMOS switch detecting circuit region 12 is preferably formed prior to the sensor switching region 20 because more is involved. These processes can include etching and implant using masks as understood by those skilled in the art. The sensor switching region can then be prepared and formed in process with the switch detecting circuit region 12. The first polysilicon layer can be deposited, and a layer of oxide, e.g., the sacrificial layer 24, deposited on the first polysilicon layer. The second polysilicon lower layer can then be deposited and, for example, also used for a local interconnect, a resistor, and the beam 26. A refractory metal upper layer or a third conducting layer, e.g., $WSi_2$, can then be deposited on the second polysilicon lower layer. Additionally, preparation of the switch detecting region can be performed, e.g., implanting, depositing, and etching, and then the window in the sacrificial layer can be etched, e.g., by using a high frequency vapor oxide release etch, so that the cantilever beam 26 or the double support beam 26' remain floating.

As illustrated and described herein, the integrated sensor 10, 10', 10" of the present invention advantageously provides an integrated sensor and associated methods for sensing temperature variations and which has a small chip area so that arrays of sensors readily can be fabricated on the same die. The present invention also advantageously provides integrated sensors and methods which increase the reliability of the sensing of the activity such as the acceleration and deceleration. The fixed contact layer 23, 23', 23" and the floating contact 26, 26', 26" of the integrated sensor 10, 10', 10" thereby advantageously provide a micromechanical sensing region 20, 20', 20" that can readily be formed with known integrated circuit manufacturing processes as understood by those skilled in the art.

The various embodiments of the integrated sensor 10 and its associated methods, including methods of forming the same, may also be advantageously used for other applications as well. For example, other integrated circuitry having related structures are illustrated in the following copending patent. applications: (1) "Integrated Released Beam Sensor For Sensing Acceleration And Associated Methods," having attorney work docket number 18978, having U.S. Ser. No. 08/957,568, assigned to the assignee of the present invention, and the entire disclosure of which is incorporated herein by reference in its entirety; (2) "Integrated Sensor Having Plurality Of Released Beams for Sensing Acceleration And Associated Methods," having attorney work docket number 19844, having U.S. Ser. No. 08/957,809, assigned to the assignee of the present invention, and the entire disclosure of which is incorporated herein by reference in its entirety; and (3) "Integrated Released Beam Oscillator And Associated Methods," having attorney work docket number 18981, having U.S. Ser. No. 08/957,804, assigned to the assignee of the present invention, and the entire disclosure of which is incorporated herein by reference in its entirety.

In the drawings and specification, there have been disclosed typical preferred embodiments of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

What is claimed is:

1. A method of forming an integrated sensor for sensing a temperature variation, the method comprising the steps of:
   forming a switch detecting circuit region; and
   forming a sensor switching region connected to and positioned adjacent the switch detecting circuit region, the sensor switching region being formed by:
      forming a first conducting layer of material on a support so as to define a fixed contact layer,
      forming a sacrificial layer on the first conducting layer,
      forming a second conducting layer on the sacrificial layer; and
      forming a third conducting layer on the second conducting layer, the second conducting layer having a different thermal expansion coefficient than the first conducting layer, and wherein the first and second conducting layers define a floating contact.

2. A method as defined in claim 1, wherein the step of forming the sensor switching region further comprises removing at least unwanted portions of the sacrificial layer to release the second conducting layer so as to define a released beam.

3. A method as defined in claim 1, wherein the step of forming the sensor switching region further comprises forming an insulating layer on the support prior to the step of forming the first conducting layer.

4. A method as defined in claim 1, wherein the fixed contact layer comprises at least one of polysilicon and a metal.

5. A method as defined in claim 1, wherein the first and second conducting layers of the floating contact comprise polysilicon and a metal, respectively.

6. A method as defined in claim 1, wherein each of the first and second conducting layers comprises at least one of the following: polysilicon, silicon, tungsten, tungsten silicide, aluminum, titanium, titanium nitride, tantalum silicide, and tantalum nitride.

7. A method as defined in claim 1, wherein the floating contact forms a released cantilever beam.

8. An integrated sensor as defined in claim 1, wherein said released beam forms a released beam overlying the fixed contact layer so as to have a configuration including at least two supports.

9. A method of forming an integrated sensor, the method comprising the steps of:
   forming a switch detecting circuit region on a substrate; and
   then forming a sensor switching region connected to the switch detecting circuit region, the sensor switching region being formed by at least the steps of:
      providing a support, the support including the substrate and an insulating layer formed on the substrate,
      forming a first conducting layer of material on the insulating layer of the support layer so as to define a fixed contact layer,
      depositing a sacrificial layer on the first conducting layer,
      depositing a second conducting layer on the sacrificial layer,
      depositing a third conducting layer on the second conducting layer, and
      removing at least unwanted portions of the sacrificial layer to release the second conducting layer so as to define a released beam overlying the fixed contact layer.

10. A method as defined in claim 9, wherein the released beam forms a released cantilever beam.

11. An integrated sensor as defined in claim 9, wherein the released beam forms a released beam overlying the fixed contact layer so as to have a configuration including at least two supports.

12. A method as defined in claim 9, wherein the step of forming the sensor switching region further comprises providing wanted remaining portions of the sacrificial layer which include an arcuate surface region underlying the second conducting layer.

13. A method as defined in claim 9, wherein the fixed contact layer comprises at least one of polysilicon and a metal.

14. A method as defined in claim 9, wherein the second and third conducting layers comprises at least one of polysilicon and a metal, respectively.

15. A method as defined in claim 9, wherein each of the first and second conducting layers comprises at least one of the following: polysilicon, silicon, tungsten, tungsten silicide, aluminum, titanium, titanium nitride, tantalum silicide, and tantalum nitride.

16. A method as defined in claim 9, wherein the integrated sensor comprises an integrated sensor for sensing temperature variation, wherein the second conducting layer has a different thermal expansion coefficient than the first conducting layer, and wherein the first and second conducting layers define a floating contact.

* * * * *